United States Patent [19]

Nakamura et al.

[11] Patent Number: 4,740,242
[45] Date of Patent: Apr. 26, 1988

[54] METHOD FOR TRANSFERRING HEAT TO MOLTEN METAL, AND APPARATUS THEREFOR

[75] Inventors: Hideo Nakamura; Kenji Takahashi; Akichika Ozeki; Shunichi Sugiyama; Masahiro Abe; Takanori Anzai, all of Tokyo, Japan

[73] Assignee: Nippon Kokan Kabushiki Kaisha, Tokyo, Japan

[21] Appl. No.: 940,579

[22] Filed: Dec. 11, 1986

[30] Foreign Application Priority Data

Dec. 18, 1985 [JP] Japan ............................ 60-282952

[51] Int. Cl.$^4$ ............................................. C21C 7/00
[52] U.S. Cl. .................................. 75/59.1; 75/10.12; 75/59.17
[58] Field of Search .................... 75/59.1, 59.17, 10.12

[56] References Cited

U.S. PATENT DOCUMENTS

| 3,649,246 | 3/1972 | Fulton | 75/59.17 |
| 3,999,977 | 12/1976 | Kolb | 75/10.12 |
| 4,551,174 | 11/1985 | Nakashima | 75/10.12 |

*Primary Examiner*—Peter D. Rosenberg
*Attorney, Agent, or Firm*—Frishauf, Holtz, Goodman & Woodward

[57] ABSTRACT

A method and an apparatus, wherein heat can be effectively transferred to molten metal contained in a reaction vessel. The pressure of the gaseous atmosphere within the vessel is maintained higher than atmospheric pressure. Oxygen gas is blown to a layer of molten slag contained in the vessel through tuyeres set in the reaction vessel, thereby to achieve post-combustion therein. The pressure in the vessel is controlled within the range of 2.0 to 5.0 kg/cm$^2$ by a pressure regulator.

22 Claims, 3 Drawing Sheets

METHOD FOR TRANSFERRING HEAT TO MOLTEN METAL, AND APPARATUS THEREFOR

BACKGROUND OF THE INVENTION

(1) Field of the Invention

The present invention relates to a method for transferring heat to molten metal contained in a reaction vessel, and also to an apparatus which has a reaction vessel and in which heat can be transferred to molten metal contained in the reaction vessel. More particularly, the invention relates to a method and an apparatus wherein heat can be transferred to molten metal contained in a reaction vessel in which CO gas is generated and can be combusted.

(2) Description of the Prior Arts

Recently, various proposals have been made with regard to a method for transferring heat to molten metal contained in a reaction vessel, in which CO gas generated therein can be combusted.

Some converters are equipped with a lance, for post-combustion, having nozzle holes in the lower end thereof, through which oxygen gas is blown out. CO gas generated from molten metal is post-combusted by oxygen gas blown out through the nozzle holes, and the heat produced thereby, as heat value necessary for the operation, is transferred through a layer of molten slag floating on top of the molten metal.

In the above-mentioned conventional method, amount of the CO gas generated is considerable, and the ascending speed thereof is, also, fast. As a result, the time for performing heat exchange between the high temperature post-combusted gas and foaming molten slag is undesirably shortened. Thus, this results in the efficiency in transferring heat to molten metal being low.

Japanese patent application Laid Open No. 74390/82, describes a method wherein:

(a) Fuel is supplied into a reaction vessel with molten metal already therein;

(b) A gas jet stream is blown onto the surface of the molten metal whereby the supplied fuel is gasified;

(c) The gasified gas is involved in the gas jet stream gas and a part of the gasified gas is combusted; and (d) The gas generated by the combustion is conveyed, together with the heat produced by the gas combustion, onto the molten metal so as to transfer the heat thereto.

In the above-mentioned method, however, the gaseous atmosphere above the molten slag is heated to a high temperature by the combustion of carbon monoxide, but the molten slag lies between the molten metal and the heated gaseous atmosphere, and, in addition, contains air. This produces the disadvantage in that the transfer of heat to the molten metal is not as efficient as it could be.

SUMMARY OF THE INVENTION

An object of the present invention is to provide a method for combusting optimizingly gas generated within a reaction vessel, and for transferring the heat produced thereby to molten metal contained in the vessel.

A further object of the present invention is to provide an apparatus which has a reaction vessel and in which gas generated within the vessel can be optimizingly combusted, and the heat produced thereby can be effectively transferred to molten metal contained in the vessel.

Another object of the present invention is to provide a method for decreasing the consumption of carbonaceous material used as the reducing agent.

These and other objects and advantages will become more apparent from the following detailed description of the invention, taken together with the accompanying drawings.

According to the present invention, a method is provided for transferring heat to molten metal contained in a reaction vessel, which comprises the steps of:

supplying the molten metal into the vessel;

maintaining the pressure of the gaseous atmosphere within the vessel higher than atmospheric pressure;

blowing in oxygen gas to the molten metal contained in the vessel; and blowing oxygen gas in the vessel, thereby to cause post-combustion.

Further, according to the present invention, there is provided an apparatus for transferring heat to molten metal, which comprises:

a reaction vessel containing the molten metal;

a regulator, connected with the vessel, for maintaining and controlling the pressure of gaseous atmosphere higher than atmospheric pressure within the vessel;

a first device for blowing oxygen gas to molten metal contained in said reaction vessel; and at least one second device for blowing oxygen gas in said reaction vessel, thereby to cause post-combustion.

DETAILED DESCRIPTION OF THE PREFERRED EMBODIMENT

Figure 1:
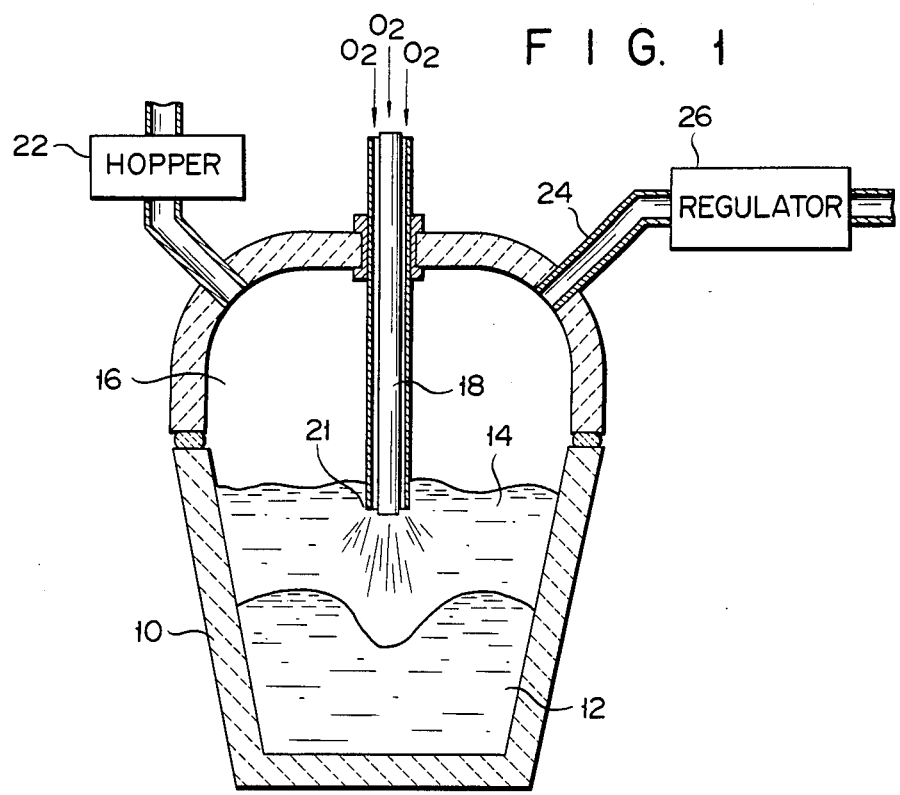
FIG. 1 is a schematic view illustrating an apparatus embodying the present invention.

Referring now to FIG. 1 showing schematically an apparatus having a smelting reduction furnace, wherein an embodiment of a method according to the present invention is carried out, reference numerals indicate as follows:

10, furnace wall;
12, molten metal;
14, molten slag layer;
16, $CO$—$CO_2$ gaseous atmosphere;
18, top-blow lance;
21, nozzle holes through which post-combustion oxygen gas is blown out;
22, material feed hopper;
24, outlet opening to the gaseous atmosphere; and
26, pressure regulator for maintaining the pressure of the gaseous atmosphere higher than atmospheric pressure.

Iron ore and coal are charged through material feed hopper 22, onto molten metal 12 within the vessel. Oxygen gas is blown in through top blow lance 18. A portion of the charged coal is combusted with the oxygen gas blown in, and CO gas is produced. Another portion dissolves into the molten metal, and the balance remains in molten slag layer 14.

The iron ore is reduced by carbon contained in molten metal 12 and molten slag layer 14. The CO gas produced by the combustion process ascends through the molten slag layer, and is further combusted with oxygen gas blown out through nozzle holes 21 set in the lower end of top blow lance 18, and heat is produced. The combustion of the CO gas with the blown out oxygen gas is, throughout the description and the claims contained herein, denoted by the term post-combustion. Amount of oxygen gas for reduction and that of oxygen gas for post-combustion are separately controlled.

CO—$CO_2$ gaseous atmosphere 16 is kept at higher than atmospheric pressure, by means of pressure regulator 26 connected to outlet 24 which opens to the gaseous atmosphere. Since keeping the pressure higher than atmospheric pressure is maintained, the slower the post-combusted gas ascends, the longer the post-combusted gas stays in molten slag layer 14. In addition, there is a greater chance that the CO gas ascending through the molten slag layer will mix with oxygen gas provided for the post-combustion, and will be combusted therewith.

Thus the decrease of the speed at which the gas ascends through the molten slag layer lengthens the time for heat exchange to take place, and, as a result, improves the heat transfer to the molten slag layer. Finally, the heat transfer to the molten metal is attained through the molten slag layer. This results in effective use of thermal energy.

In the foregoing, the embodiment according to the present invention is applied to a smelting reduction process for iron ore. The application thereof, however, is not limited to the smelting reduction process and can be applied to steel making for decarburization and dephosphorization.

To carry out the embodiment, it is preferable to keep the pressure of gaseous atmosphere 16 at approximately 2 to 5 kg/cm². This range reduces the speed at which the post-combusted gas ascends, to a half to a fifth of the conventional rate and also lowers the rate of ascent of the CO gas generated in the molten metal. This pressure range does not affect the speed of the reaction represented by the following formula:

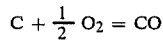

$$C + \frac{1}{2} O_2 = CO$$

If the pressure is less than 2 kg/cm², it may be impossible to reduce the rate of ascent of the post-combusted $CO_2$ gas and the generated CO gas.

On the other hand, a pressure of more than 5 kg/cm² may undesirably reduce the speed of the reaction, which is given by the above-mentioned formula. The pressure of CO—$CO_2$ gaseous atmosphere 16 is controlled by pressure regulator 26, more precisely by controlling the opening of the valve of regulator 26 in accordance with the pressure measured.

In this embodiment, oxygen gas for post-combustion is blown in through nozzle holes 21 set in the lower end of lance 18. Alternatively, the oxygen gas can be blown in other ways.

Figure 2:
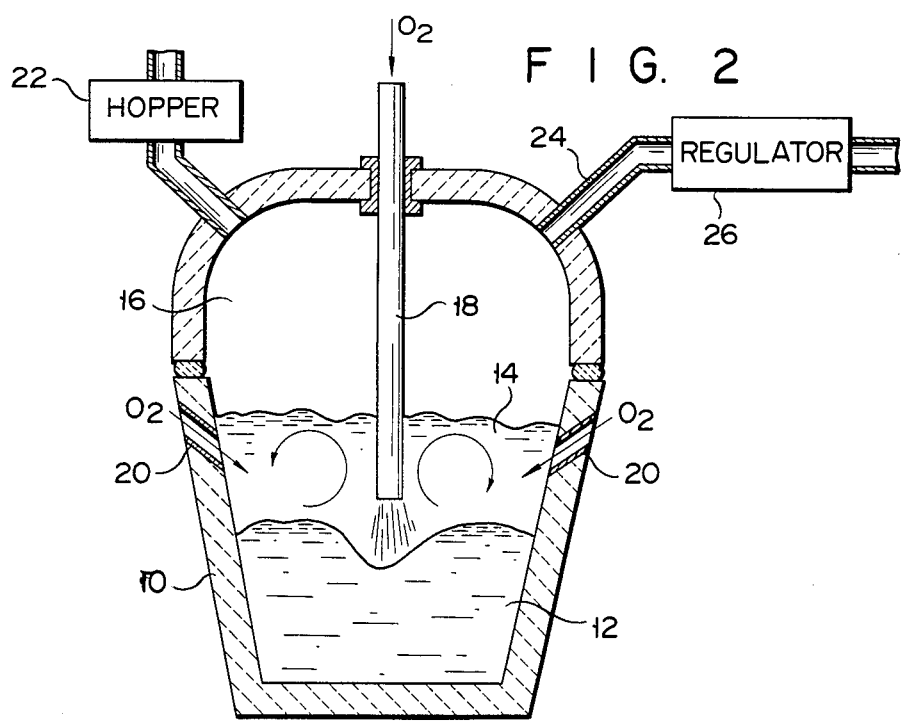
FIG. 2 is a schematic view illustrating another example of an apparatus embodying the present invention.

FIG. 2 schematically illustrates an example of another apparatus according to the invention having a reaction vessel provided with a plurality of side-blow tuyeres 20 set in wall 10. Through tuyeres 20, oxygen gas for post-combustion can be blown into the molten metal layer. These tuyeres 20 are sloping downward and open to the layer of slag contained in the vessel. The quantity of charging material and the quantity of tapping molten metal are controlled so as to keep the level of layer 14 constant. Material is charged through feeding hopper 22. A tapping hole for the molten metal (not shown) can be cut in the furnace wall in the publicly known manner.

Oxygen gas, for reduction, is blown in molten metal 12, through top blow lance 18. The oxygen gas for post-combustion is blown into the vessel through tuyeres 20 sloping downward and opening to layer 14 of molten slag. As a result, the molten slag first moves downward, then hits against the top of the molten metal, and finally moves upward, thus circulating within the vessel. The oxygen gas reacts with CO gas ascending through layer 14 of molten slag. The reaction heat is transferred to the molten slag, and further to molten metal 12, since the molten slag is circulating.

Tuyeres 20 are sloping downwards in the apparatus shown in FIG. 2. They can be inclined upward, in which case the molten slag can circulate in the same manner. However, it is preferable that tuyeres 20 be sloping downwards, since more oxygen gas can be blown into the molten slag, and the molten slag can circulate more vigorously.

Figure 3:
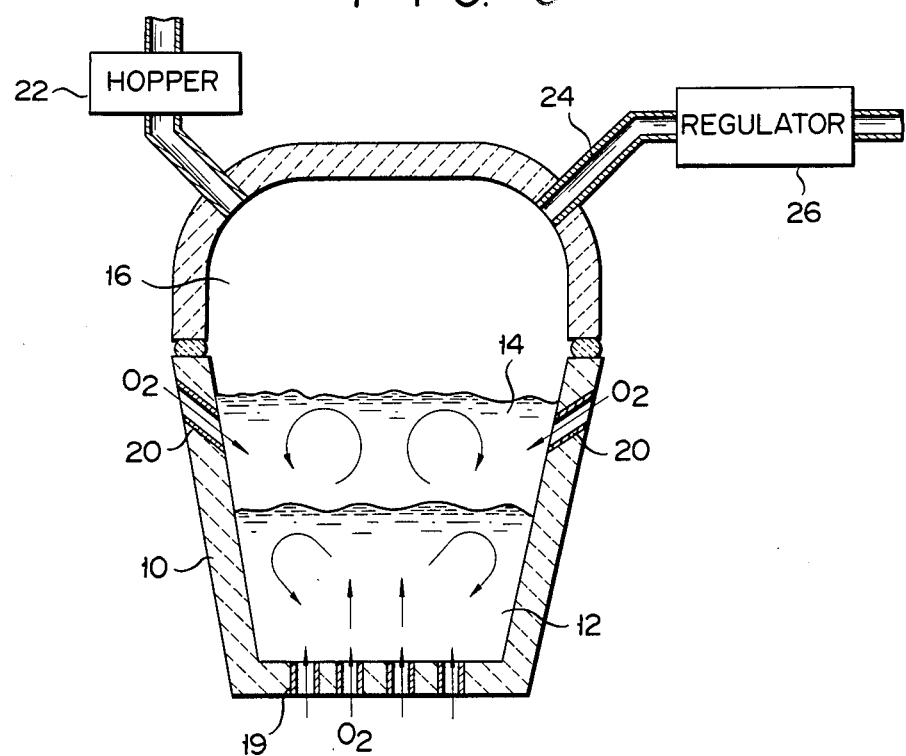
FIG. 3 is a schematic view of a further apparatus embodying the present invention.

Furthermore, in place of top-blow lance 18 shown in FIG. 2, for blowing in oxygen gas for reduction, bottom-blow tuyeres 19 shown in FIG. 3 can be employed.

Figure 4:
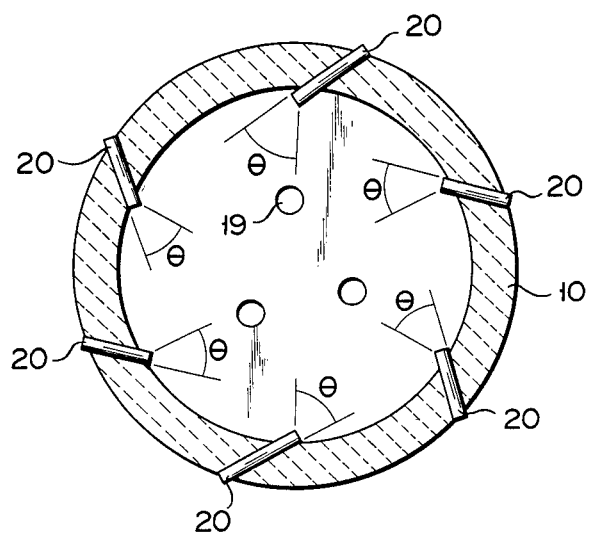
FIG. 4 is a schematic cross-sectional plan view of an apparatus for blowing in oxygen gas for post-combustion performed, according to the present invention.
Figure 5:
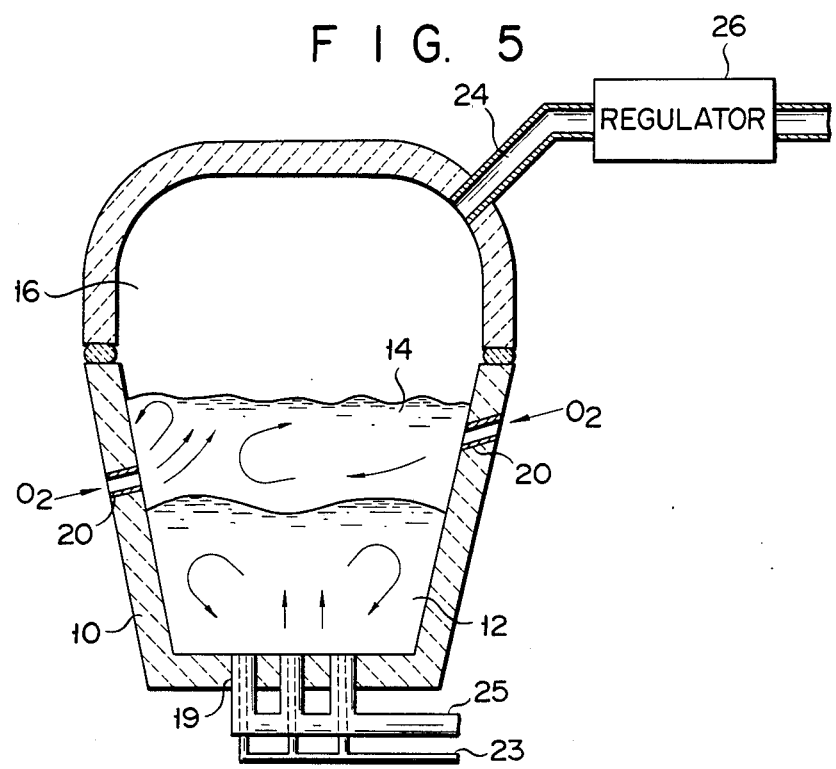
FIG. 5 is a schematic sectional side elevation view of the apparatus shown in FIG. 4.

FIGS. 4 and 5 show still another apparatus having a reaction vessel. A plurality of bottom-blow tuyeres 19 are set in the bottom of the vessel, and a plurality of side-blow tuyeres 20 are provided in furnace wall 10 of the vessel. Side-blow tuyeres 20 are inclined, in a horizontal plane, at angle θ to the radius of the vessel, as is shown in FIG. 4. Some of tuyeres 20 are sloping downwards, and the others are sloping upwards, as is illustrated in FIG. 5. Angle θ can be given as follows:

0<θ<180°/n, where n is the number of tuyeres 20 and is 3 or more, or

0<45°, where n=2.

Angle θ can be changed within the ranges represented by the foregoing formulas. If angle θ falls outside the ranges, the molten slag cannot circulate sufficiently.

In the apparatus of FIGS. 4 and 5, all tuyeres 20 are inclined at the same angle to the radius of the vessel. Instead, some of tuyeres 20 can be inclined at an angle, whereas the others can be inclined at another angle.

As has been described, some of tuyeres 20 are sloping downwards, and the others are sloping upwards. More specifically, they can be sloping alternately downwards and upwards, or, for instance, any two adjacent tuyeres 20 can be sloping down while the next two are sloping up.

Side-blow tuyeres 20 are set in furnace wall 10 such that they open to layer 14 of molten slag. Molten metal 12 is kept moving by the stream of oxygen gas provided for the reduction thereof, or by the blow of powders and gas blown thereon during the smelting reduction process, but the surface level of the molten metal and the thickness of the molten-slag layer are constantly controlled. Accordingly, the side-blow tuyeres can be positioned to open to the molten-slag layer.

Oxygen gas for reduction is blown in through outer pipe 25 of bottom-blow tuyeres 19, and fine iron ore and powdered coal are blown in through inner pipe 23 of tuyeres 19. Oxygen gas for post-combustion is blown in through side-blow tuyeres 20. Layer 14 of molten slag highly heated by post-combustion is circulated within the vessel, in both a horizontal plane and a vertical plane, and transfers the heat to molten metal 12 since it contacts metal 12.

EXAMPLE 1

An example of smelting reduction of iron ore will now be described, using the apparatus shown in FIG. 1, according to the present invention.

In this example, 50 tons of molten metal 12 was fed into the melting reduction furnace. The pressure of gaseous atmosphere 16 was set to 3 kg/cm$^2$ by pressure regulator 26.

Iron ore and coal were fed through feeding hopper 22. Oxygen gas for reduction was blown in through lance 18, and oxygen gas for post-combustion was blown in through nozzle holes 21 set in the lower end of the lance.

The oxygen gas for post-combustion was introduced into molten slag layer 14 in an amount of 50% of oxygen flow-rate for post-combustion which is given as follows:

$$\text{oxygen flow-rate for post-combustion (\%)} = \frac{\text{amount of } O_2 \text{ for post-combustion}}{\frac{\text{amount of CO generated}}{2}} \times 100$$

Rate of molten metal production was 32 tons/hour.

to demonstrate the advantage of the invention, Controller 1, wherein gaseous atmosphere 16 was set to atmospheric pressure, was carried out, thereby producing molten metal at the rate of 32 tons/hour. The results are shown in Table 1, along with the results of Example 1.

TABLE 1

|  | Controller 1 | Example 1 |
| --- | --- | --- |
| Iron ore (kg/min.) | 840 | 840 |
| Coal (kg/min.) | 380 | 312 |
| Amount of O$_2$ (Nm$^3$/min.) | 275 | 225 |
| Oxygen flow-rate for post-combustion (%) | 47 | 48 |
| Heat efficiency (%) | 63 | 80 |

The "heat efficiency" is given:

$$\text{Heat efficiency} = \frac{A}{B}$$

where A represents heat given to molten metal, and B represents heat produced when all oxygen gas for post-combustion is consumed.

In Example 1, as is clearly understood from Table 1, the consumption of coal and that of oxygen gas were reduced, compared with Controller 1, since the heat efficiency of Example 1 was higher than that of Controller 1.

EXAMPLE 2

Another example of smelting reduction of iron ore was carried out, using the apparatus shown in FIG. 1. The smelting operation was performed with gaseous atmosphere 16 being set at a pressure of 3 kg/cm$^2$, and oxygen gas for post-combustion was introduced in oxygen flow-rate for post-combustion of 0 to 100%.

Controller 2, wherein gaseous atmosphere 16 was set to atmospheric pressure, and oxygen gas was introduced in the same oxygen flow-rate for post-combustion was performed.

Figure 6:
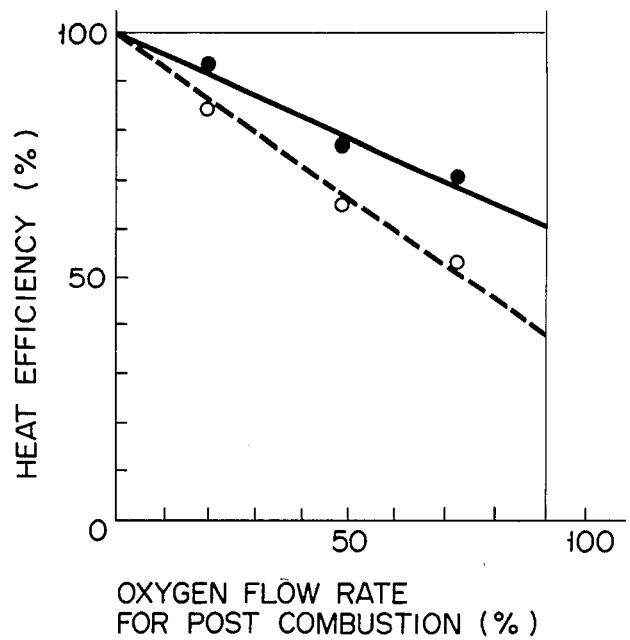
FIG. 6 is a graphic representation showing the relationship between oxygen flow-rate for post-combustion and heat efficiency.

FIG. 6 shows graphically the results of Example 2 and Controller 2. The results of Example 2 and Controller 2 are illustrated respectively by a solid and a broken line. As these lines show, the heat efficiency of Example 2 is 15%, on average, higher than that of Controller 2. Therefore, the transfer of heat to the molten metal can be achieved efficiently by controlling, appropriately, the pressure of gaseous atmosphere 16, by means of pressure regulator 26 in compliance with the amount of CO gas generated and with the state of foaming molten slag layer 14.

EXAMPLE 3

In this example, two different test operations of smelting reduction were carried out by changing the method of blowing in oxygen gas for post-combustion. The pressure of gaseous atmosphere 16 was set to 3 kg/cm$^2$.

Test Operation A

An apparatus as is shown in FIG. 2 was employed. Oxygen gas for reduction, and oxygen gas for post-combustion, were respectively blown in straight downwards through lance 18 and at a downward-sloping angle through six side-blow tuyeres 20.

Test Operation B

An apparatus as is shown in FIGS. 4 and 5 was employed. Six side-blow tuyeres 20 were set in furnace wall 10 at angle $\theta$ of 30°. Three bottom-blow tuyeres 19 were each composed of an inner pipe 23 and an outer pipe 25 embracing inner pipe 23. Oxygen gas for reduction, was introduced through outer pipe 25 of each tuyere 19, and a mixture of fine iron ore and powdered coal, was introduced through inner pipe 23. Oxygen gas for post-combustion was blown in through side-blow tuyeres 20, so as to circulate the molten slag in both a horizontal plane and a vertical plane.

The results of the operations A and B are listed, together with those of Example 1, in Table 2.

TABLE 2

|  | Example 1 | Example 3A | Example 3B |
| --- | --- | --- | --- |
| Iron ore (kg/min.) | 840 | 840 | 840 |
| Coal (kg/min.) | 312 | 305 | 298 |
| Amount of O$_2$ (Nm$^3$/min.) | 225 | 220 | 215 |
| Oxygen flow-rate for post-combustion (%) | 48 | 49 | 48 |
| Heat efficiency (%) | 80 | 86 | 88 |

The results of Examples 3A and 3B proved an improvement in the heat efficiency, and a reduction in the consumption of coal and oxygen needed for reduction, in comparison with Example 1.

What is claimed is:

1. A method for transferring heat to molten metal contained in a closed reaction vessel wherein a gaseous atmosphere is maintained, which comprises the steps of:
   supplying the molten metal into the vessel;
   maintaining the pressure of said gaseous atmosphere within the vessel higher than atmosphere pressure;
   blowing in oxygen gas to the molten metal contained in the vessel; and blowing oxygen gas for post-combustion in the vessel, thereby to cause post-combustion.

2. The method according to claim 1, wherein said step of maintaining the pressure of the gaseous atmosphere includes maintaining said pressure between about 2 and about 5 kg/cm$^2$, by means of a pressure regulator.

3. The method according to claim 1, wherein said step of blowing in oxygen gas to said molten metal includes blowing said gas through a top-blow lance.

4. The method according to claim 1, wherein said step of blowing in oxygen gas to said molten metal includes blowing said gas through a bottom-blow tuyere.

5. The method according to claim 1, wherein said step of blowing oxygen gas for post-combustion includes blowing said gas into a layer of molten slag contained in the vessel.

6. The method according to claim 5, wherein said step of blowing oxygen gas for post-combustion includes blowing said gas through a plurality of side-blow tuyeres set in the wall of said vessel, opening onto said molten slag layer within said vessel.

7. The method according to claim 6, wherein said blowing oxygen gas through a plurality of side-blow tuyeres further includes blowing said gas at a downward-sloping angle.

8. The method according to claim 6, wherein said step of blowing oxygen gas through a plurality of side-blow tuyeres further includes blowing said gas at an angle ($\theta$), in a horizontal plane, with respect to the radius of said vessel, and also at upward-sloping and downward-sloping angles, through said side-blow tuyeres the number of which is represented by n, said angle ($\theta$) being represented by:

$0 < \theta < 180°/n$ in the case where $n \geq 3$, or
$0 < \theta < 45°$ in the case where $n = 2$.

9. The method according to claim 5, wherein said step of blowing oxygen gas for post-combustion includes blowing said gas, through nozzle holes set in a top-blow lance, into said molten slag layer within said vessel.

10. The method according to claim 1, wherein said step of supplying said molten metal into said vessel includes supplying said molten metal into a converter.

11. The method according to claim 1, wherein said step of supplying said molten metal into said vessel includes supplying said molten metal into a smelting reduction furnace.

12. The method according to claim 1, which further comprises a step of supplying iron ore and carbonaceous material into said vessel.

13. A method for transferring heat to molten metal within a reaction vessel, comprising the steps of:
supplying the molten metal into said vessel;
blowing in oxygen gas in molten metal contained in said vessel; and
blowing oxygen gas for post-combustion, into a layer of molten slag, through a plurality of downward-sloping side-blow tuyeres set in the wall of said vessel, opening onto said layer, 14. A method for transferring heat to molten metal contained in a reaction vessel, comprising the steps of:
supplying said molten metal into said vessel;
blowing in oxygen gas to the molten metal contained in said vessel; and
blowing oxygen gas for post-combustion into a layer of molten slag at an angle ($\theta$), in a horizontal plane, with respect to the radius of said vessel, and also at upward-sloping and downward-sloping angles, through a plurality of side-blow tuyeres the number of which is represented by n, said angle ($\theta$) being represented by:

$0 < \theta < 180°/n$ in the case where $n = 3$, or
$0 < \theta < 45°$ in the case where $n \geq 2$.

15. An apparatus for transferring heat to molten metal, which comprises:
a reaction vessel adapted to contain the molten metal;
a regulator, connected with said vessel, for maintaining and controlling the pressure of gaseous atmosphere higher than atmospheric pressure within said vessel;
a first device for blowing oxygen gas to molten metal contained in said reaction vessel; and
at least one second device for blowing oxygen gas, thereby to cause post-combustion.

16. The apparatus according to claim 15, wherein said first device is a top-blow lance.

17. The apparatus according to claim 15, wherein said first device includes at least one bottom-blow tuyere.

18. The apparatus according to claim 15, wherein said second device is comprised of a plurality of side-blow tuyeres set in the wall of said vessel and opening onto molten slag layer.

19. The apparatus according to claim 18, wherein said side-blow tuyeres are sloping downwards.

20. The apparatus according to claim 18, wherein said side-blow tuyeres are provided to blow oxygen gas at an angle ($\theta$), in a horizontal plane, with respect to the radius of said vessel, and also at upward-sloping and downward-sloping angles, said angle ($\theta$) being represented by:

$0 < \theta < 180°/n$ in the case where $n \geq 3$, or
$0 < \theta < 45°$ in the case where $n = 2$.

where n is the number of said side-blow tuyeres.

21. The apparatus according to claim 15, wherein said second device is a lance having nozzle holes for supplying oxygen gas for post-combustion.

22. The method according to claim 1, wherein the pressure of the gaseous atmosphere is maintained at a pressure of at least about 2 kg/cm$^2$.

* * * * *